United States Patent [19]
Aupoix et al.

[11] 3,742,116

[45] June 26, 1973

[54] TRANSPOSED ELECTRIC CABLE AND METHOD OF PRODUCING THE SAME

[75] Inventors: Marcel Aupoix, Paris; François Moisson-Franckhauser, Bretigny-sur-Orge, both of France

[73] Assignee: Compagnie Generale D'Electricite, Paris, France

[22] Filed: June 19, 1972

[21] Appl. No.: 264,085

[30] Foreign Application Priority Data
June 23, 1971 France .............................. 7122884

[52] U.S. Cl.................. 174/34, 29/599, 29/624, 174/15 C, 174/117 F, 174/DIG. 6
[51] Int. Cl.. H01b 11/02, H01v 11/00, H01b 13/06
[58] Field of Search.................. 174/33, 34, 15 R, 174/15 C, 117 R, 117 F, 117 FF, 115, 113 R, 113 C, 130, 131 A, DIG. 6; 29/599, 624, 625

[56] References Cited
UNITED STATES PATENTS

| | | | |
|---|---|---|---|
| 3,453,725 | 7/1969 | Donelan et al. ............... | 174/DIG. 6 |
| 3,382,315 | 5/1968 | Minnich............................. | 174/34 |
| 3,638,154 | 1/1972 | Sampson ...................... | 174/117 F |
| 3,657,466 | 4/1972 | Woolcock......................... | 174/15 C |
| 3,634,597 | 1/1972 | Ziemek............................ | 174/34 X |
| 3,514,524 | 5/1970 | Buchhold........................... | 174/34 |
| 469,248 | 2/1892 | Holman ............................ | 174/34 |
| 473,352 | 4/1892 | Sawyer.............................. | 174/34 |

*Primary Examiner*—Bernard A. Gilheany
*Assistant Examiner*—A. T. Grimley
*Attorney*—Richard C. Sughrue, Donald E. Zinn et al.

[57] ABSTRACT

Transposed electric cable consisting of composite conductive strips arranged so that one of their edges is tangent to a central duct of the cylindrically formed cable. The faces of the adjacent strips partly overlap.

8 Claims, 4 Drawing Figures

TRANSPOSED ELECTRIC CABLE AND METHOD OF PRODUCING THE SAME

BACKGROUND OF THE INVENTION

1. Field of the Invention

The present invention concerns a transposed electric cable, as well as the method for manufacturing it. These cables are generally used in conveying high power alternating current, more particularly at cryogenic temperatures. They can also be used at ambient temperature for frequencies of several kilohertz.

2. Description of the Prior Art

The manufacturing of such cables to avoid the very troublesome electrical phenomenon called "skin effect" is known. In a solid conductor made of high purity aluminum, for example, at a temperature of 80° Kelvin and for an alternating current at a frequency of 50 or 60 c/s, experience shows that the maximum penetration of the current at the periphery of the conductor is comprised between 3 and 4 millimeters. A known method consists in subdividing that solid conductor into several elementary conductive strands, in order to obtain a better distribution of the current. This is the case of the composite conductor. The manufacturing of cables formed by several elementary cables twisted together is also known. The manufacturing of composite conductors sets mechanical problems which are difficult to solve, and more particularly, the problem of the maximum filling with conductive strands in a given unit of volume. Moreover, the combining of very thin strands does not cancel completely the phenomenon of "skin effect."

For the electrical resistance of the cable with alternating current to remain close to that which it would have in direct current, it is necessary for the diameter of the strands to be all the smaller as the cross-section of the conductive cable is greater. For the conveyed current not to undergo variations along the cable, it is necessary for the strands of the cable to occupy successively the various positions between the inside and outside diameters of the latter. Moreover, subsequent to ohmic losses, an optimum cross-section, known as an "economical cross-section," as well as an inside diameter of the cable which is as small as possible, must be adopted.

The diameter of the strands results, therefore, from the amperage of the current in the cable.

It is then difficult to manufacture a cable conveying a high current, for its "economical" cross-section must be great, and the diameter of the strands which compose it very small. According to known techniques, the filling cofficient of the strands, per unit of volume, is fairly small.

The present invention aims at overcoming these difficulties.

SUMMARY OF THE INVENTION

The present invention has for its object a transposed electric cable, comprising several composite conductive strips having slight thickness and great length, each strip having first and second opposite faces whose surface is great, and first and second opposite edges whose surface is small, these strips being adjacent and distributed round a cylindrical casing by angular staggering round the axis of that casing, the first edge of each strip being arranged on the casing, and the second edge being placed further from the axis of that casing than that first edge, characterized in that each of the composite conductive strips consists of an electrically insulating central tape on which conductive strands which form a constant angle with the axis of the central tape are helically wound.

The present invention also has for its object a method for manufacturing the above-mentioned electric cable, comprising the following phases:

A phase in which the peripheral strips are manufactured by cementing the conductive strands arranged longitudinally to an electrically insulating supporting strip;

A phase in which the composite conductive strips are manufactured by winding several of the peripheral strips round an electrically insulating central tape, with a constant winding angle;

A phase in which several composite conductive tapes are stacked with their adjacent faces having a great surface one on top of the other;

A phase in which the transposed cable is manufactured from the preceding stacking, so that the strips are distributed round the said cylindrical casing, by angular staggering round the axis of that casing.

The invention will be better understood from the following description, given only by way of illustration, and having no limiting character, with reference to the accompanying diagrammatic drawings.

BRIEF DESCRIPTION OF THE DRAWINGS

Corresponding elements in these various figures bear the same references.

DESCRIPTION OF THE PREFERRED EMBODIMENTS

Figure 1:
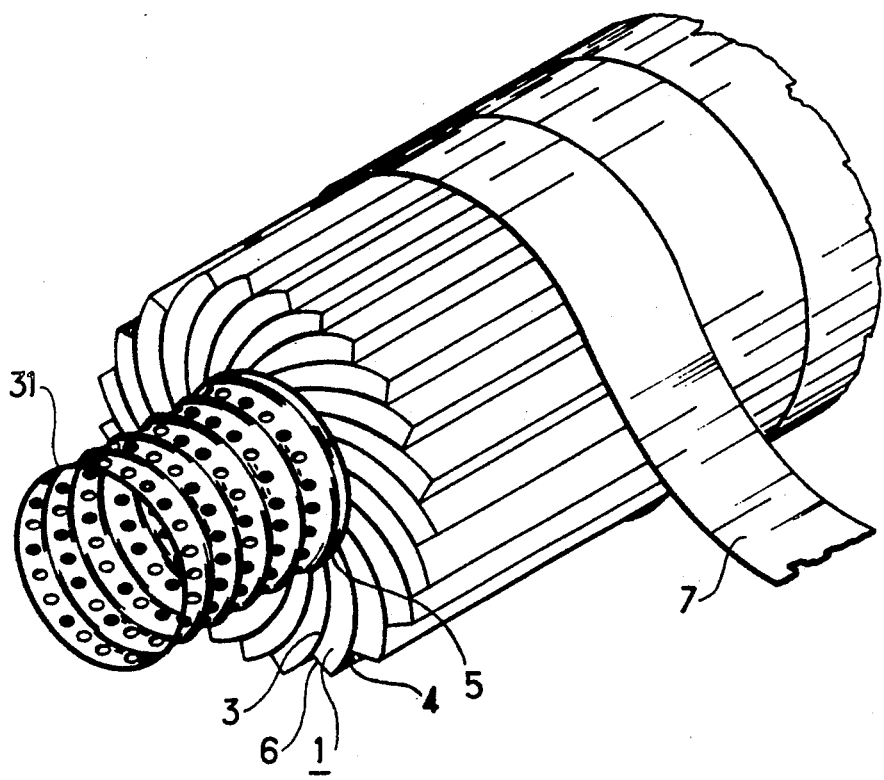
FIG. 1 is a diagrammatic perspective view of a transposed cable obtained by combining several composite conductive tapes.

The cable in FIG. 1 comprises several composite conductive strips such as the strip 1, arranged longitudinally so as to form a cable having the form of a cylinder whose central web is a perforated corrugated casing 31.

The strip has a first face 3 and a second face 4, having a great surface, and two edges 5 and 6 having a small surface. These strips are arranged in the cable so that the first face of the one partly covers one face of an adjacent strip and that the second face is partly covered by one face of another adjacent strip. One of the edges of each strip 5, for example, is tangent to the casing 31. The strips then have a transversal spiral form; they are distributed by angular staggering about the axis of the casing.

An insulating tape 7 made of polyethylene, for example, is wound round the cable so as to ensure good cohesion thereof.

The central duct formed can then be used for conveying a fluid, more particularly a cryogenic fluid.

Figure 2:
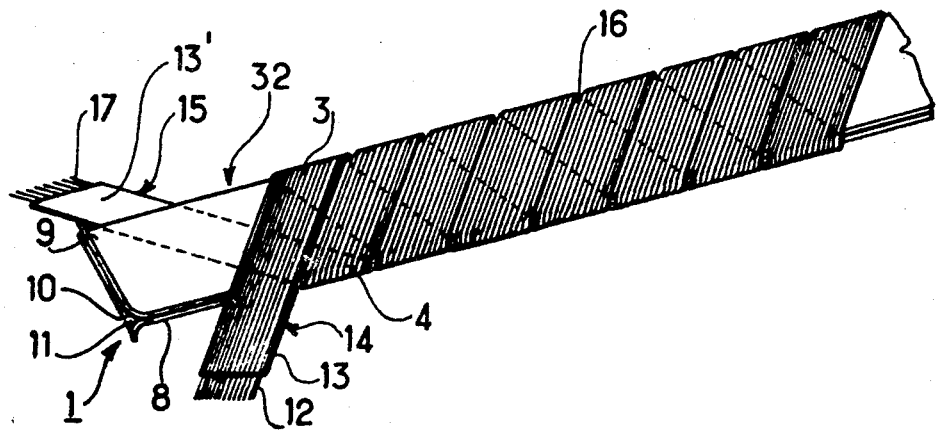
FIG. 2 is a diagrammatic perspective view of a composite conductor according to the invention.

FIG. 2 is a diagrammatic perspective view of one of these composite conductive strips 1 which comprises: an electrically insulating central tape 32, consisting of two electrically insulating strips 8 and 9, made of polyethylene, for example, and fixed together by their adjacent faces 10 and 11. These strips 8 and 9 have a very small thickness, to enable a good filling coefficient to be obtained. They ensure, moreover, good mechanical resistance of the composite conductive strip. Conductive unitary strips 14 and 15, each consisting of an adhesive insulating tape 13 and 13' on which conductive wires or strands 12, 17, are cemented, are helically wound around these insulating strips 8 and 9.

These conductive wires can be, for example, made of aluminum, covered with insulating varnish, and they can have a rectangular cross-section, in order to obtain a better filling coefficient per unit of volume. By way of an example, it has been supposed that two of these unitary strips, 14 and 15, have been helically wound simultaneously round the insulating strips 8 and 9.

By way of an example, a hundred or so wires or strands of aluminum having a diameter of 0.5 millimeters are arranged parallel in a same unitary strip, and the composite strip thus obtained has a width of about 50 to 55 millimeters for a thickness of 0.5 to 0.6 millimeters approximately. Two successive unitary strips forming a part of the structure of a composite conductive strip are, as required, separated by an interval 16 in order to make it easier to deform the composite strip when it is installed, to form the transposed cable.

One of the advantages of such an arrangement resides more particularly in a substantial increase of the filling coefficient of the conductive strands of each composite strip per unit of volume. Indeed, presently known transposed cables comprise, for each composite strip, from 25 to 35 conductive strands, and the thickness of each strip is 1.6 millimeters approximately. Here, the composite strips 1 are the equivalent of two hundred conductive strands, in all, and each strip has a thickness of 0.5 millimeters approximately; hence the possibility of accommodating a great number of strips, and, therefore, of conductive strands, in the same cable.

Figure 3:
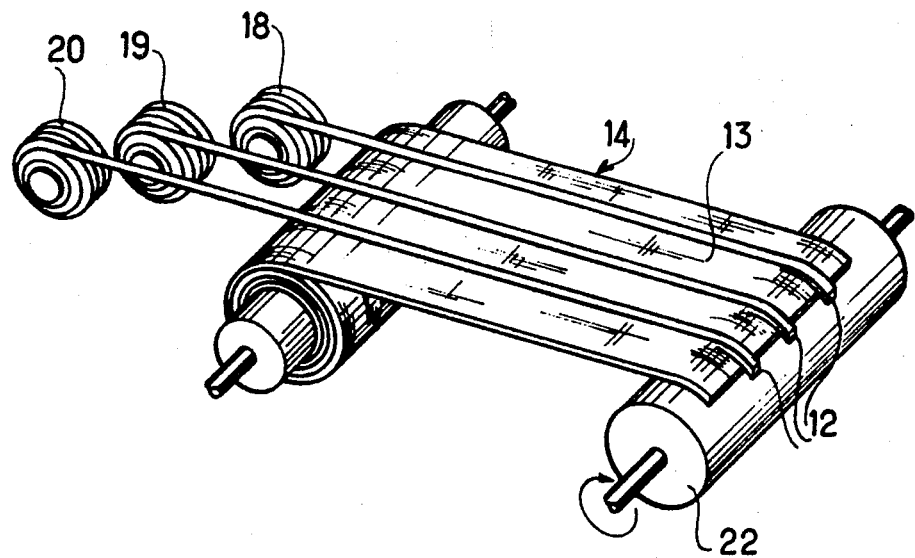
FIGS. 3 and 4 are views of different phases in the method for manufacturing the cable in FIG. 1.

FIG. 3 is a diagram showing one of the stages of the first phase of the method for manufacturing the transposed cable which has just been described. This is a phase for the forming of the unitary strip 14, for example, in FIG. 2, comprising the aluminum conductive strands 12. The number of strands shown has been limited to three, to make drawing easier, but it is quite evident that that number is, in general, greater. Each of these strands comes from one of the windings 18, 19 or 20, driven in a rotating movement, and passes on an adhesive insulating strip 13 to which the conductive wires 12 adhere. That adhesive strip is paid out by a roller, and it is quite evident that, to make illustrating easier, the number of conductors has been limited to three, but that it is possible according to an identical method, to obtain a unitary, conductive strip 14 comprising a hundred or so aluminum conductive wires, this unitary conductive strip having a width of approximately 50 millimeters, and a thickness of 0.5 millimeters. This unitary conductive strip 14 can then be wound on a roller 22, so as to make handling thereof easier. It is quite evident, also, that any other method making it possible to obtain a like unitary strip, having the same technical characteristics, could have been chosen, without going beyond the scope of the invention.

Figure 4:
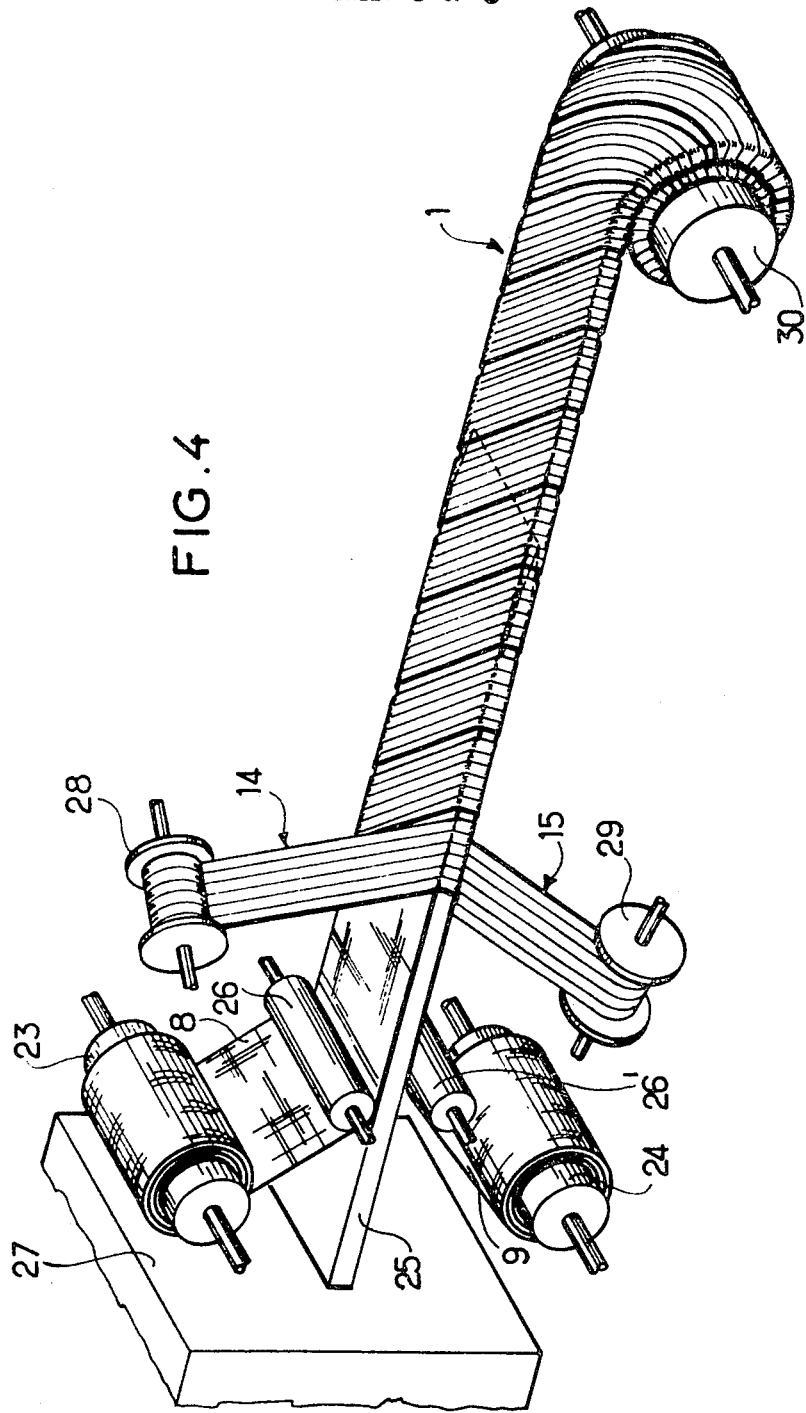

FIG. 4 shows another stage of that first phase of the method for manufacturing the transposed cable according to the invention. This is the last phase which enables the composite conductive strip to be obtained.

Two electrically insulating strips 8 and 9, made of polyethylene, for example, are unrolled, respectively, from two rollers 23 and 24 so as to be placed on both sides of a blade 25 whose thickness varies in a wedge shape, due to two stretching rollers 26 and 26', the horizontal blade being fast with a fixed support 27.

The unitary conductive strips 14 and 15 are helically wound around these two insulating strips 8 and 9, at the level of the blade 25. These strips are paid out by rollers 28 and 29. The composite strip 1 composed by the assembling of the insulating strips 8 and 9 and the unitary strips 14 and 15 is wound on a roller 30, so as to make handling thereof easier. As soon as the strips 8 and 9 leave the blade 25 which is used for guiding them, only these insulating strips undergo the longitudinal tensile stresses exerted by the roller 30.

A great number of composite strips such as 1, are stacked, then arranged on the perimeter, and in contact, by their edge, with the perforated corrugated casing 31, so as to form the cable in FIG. 1.

It is quite evident that a different means could have been used for giving the transposed cable its cylindrical form.

One of the advantages of such a structure resides in a very great filling coefficient, therefore in the possibility of conveying on electric current in a low-resistance conductor whose economical diameter is minimized. Moreover, the manufacturing method is simple, not very expensive; the transposed cable obtained is flexible; it can easily be wound on a roller facilitating the transporting and installing thereof. Constancy of length of the cable can be obtained by an appropriate choice of the winding angle of the unitary conductive strips on the central insulating strips.

While the invention has been particularly shown and described with reference to preferred embodiments thereof, it will be understood by those skilled in the art that various changes in form and details may be made therein without departing from the spirit and scope of the invention.

What is claimed is:

1. In an electric cable having transposed conductive strands, comprising several composite conductive strips of small thickness and great length, each strip having first and second opposite faces with a great surface, and first and second opposite edges with a small surface, these strips being adjacent and distributed round a cylindrical casing by angular staggering round the axis of that casing, said first edge of each strip being arranged on said casing, and said second edge being placed further away from the axis of that casing than that first edge, the improvement wherein: each of said composite conductive strips consists of an electrically insulating central tape on which conductive strands which form a constant angle with the axis of the central tape are helically wound.

2. The cable according to claim 1, wherein: said electrically insulating central tape consists of two electrically insulating strips joined together by their adjacent faces.

3. The cable according to claim 1, wherein: said conductive strands form parts of peripheral strips, and each of said peripheral strips comprise an electrically insulating supporting strip on which certain of said strands are longitudinally cemented.

4. The cable according to claim 1, wherein: said composite conductive strips have a transversal helically curved shape.

5. In a method of manufacturing an electric cable having transposed conductive strands comprising several composite conductive strips of small thickness and great length, with each strip having first and second opposite faces with a great surface and first and second opposite edges with a small surface, including the steps of:
  distributing several conductive strips in adjacent staggered fashion angularly around the cylindrical casing with said first edge of each strip arranged on said casing and said second edge placed further away from the axis of the casing than the first edge, the improvement comprising:
  the step of helically winding conductive strands which form a constant angle with the axis of said electrically insulating central tape.

6. The method of manufacturing an electric cable as claimed in claim 5, wherein the step of helically winding the conductive strands on the electrically insulating central tape comrising: cementing conductive strips longitudinally on electrically insulating supporting strips.

7. The method of manufacturing an electric cable as claimed in claim 5, further comprising the step of stacking several composite conductive strips with their adjacent faces having a great surface one on top of another.

8. The method of manufacturing an electric cable as claimed in claim 6, further comprising the step of stacking several composite conductive strips with their adjacent faces having a great surface one on top of another.

* * * * *